United States Patent [19]

Smay et al.

[11] Patent Number: 4,824,052

[45] Date of Patent: Apr. 25, 1989

[54] NUTATION SENSOR AND NUTATION CONTROL SYSTEM FOR A DUAL-SPIN STABILIZED SATELLITE

[75] Inventors: John W. Smay, Torrance; John F. Yocum, Jr., Rancho Palos Verdes; Eugene Gonzalez, Jr., Hawthorne, all of Calif.

[73] Assignee: Hughes Aircraft Company, Los Angeles, Calif.

[21] Appl. No.: 63,373

[22] Filed: Jun. 18, 1987

[51] Int. Cl.$^4$ ............................................. B64G 1/38
[52] U.S. Cl. .................................. 244/170; 244/171
[58] Field of Search ............... 244/164, 165, 169, 170, 244/171

[56] References Cited

U.S. PATENT DOCUMENTS

| | | |
|---|---|---|
| 3,714,434 | 1/1973 | Mears, Jr. et al. |
| 3,830,447 | 8/1974 | Phillips ............................ 244/170 |
| 3,996,804 | 12/1976 | Neufeld ............................ 244/171 |
| 4,096,427 | 6/1978 | Rosen ............................... 244/170 |
| 4,272,045 | 6/1981 | Phillips ............................ 244/170 |
| 4,275,861 | 6/1981 | Hubert ............................. 244/170 |
| 4,437,047 | 3/1984 | Smay . |

FOREIGN PATENT DOCUMENTS

| | | |
|---|---|---|
| 0119810 | 9/1984 | European Pat. Off. . |
| 1574529 | 7/1969 | France . |
| 8600863 | 2/1986 | PCT Int'l Appl. . |
| 8700654 | 1/1987 | PCT Int'l Appl. . |
| 8700653 | 1/1987 | PCT Int'l Appl. . |

*Primary Examiner*—Galen Barefoot
*Attorney, Agent, or Firm*—S. M. Mitchell; M. J. Meltzer; A. W. Karambelas

[57] ABSTRACT

A nutation sensor and nutation control system using a relative spin phase sensor in a dual-spin stabilized satellite is disclosed. The relative spin phase sensor provides index pulses indicative of the relative spin phase and rate between the satellite rotor and platform. Nutation of the satellite perturbs the relative spin position of the rotor and platform and means are provided for analyzing index pulse arrive times to calculate nutation of the satellite. In the nutation control system, means are provided to apply a nutation damping torque to the satellite.

18 Claims, 3 Drawing Sheets

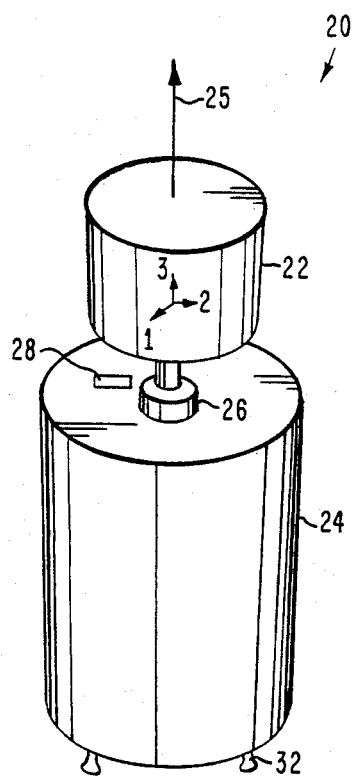
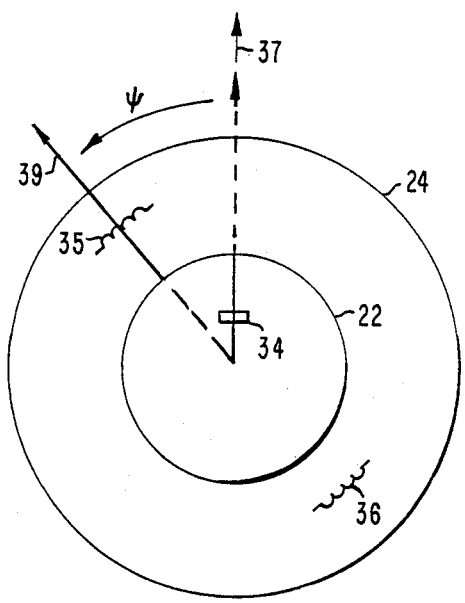
Fig. 1.
Fig. 2.

[4,824,052]

NUTATION SENSOR AND NUTATION CONTROL SYSTEM FOR A DUAL-SPIN STABILIZED SATELLITE

BACKGROUND OF THE INVENTION

The present invention relates generally to satellite control systems and more particularly to nutation control systems for dual-spin stablized satellites.

In many satellite applications, it is desirable and necessary to precisely maintain the satellite in a predetermined orientation or attitude with respect to a given reference direction. This may be particularly true for communications satellites in geosynhcronous orbit where an antenna must be maintained in a given orientation toward a ground station. One well-known method of maintaining the orientation of a satellite is by spinning the satellite about an axis of symmetry. To provide a portion of the satellite, such as an antenna, with a relatively constant orientation with respect to an outside reference direction, one portion of the satellite may be spun while another portion on which the antenna is mounted is despun. Thus, a dual-spin stabilized satellite is characterized by a rotor or spun portion and a platform or despun portion, the two portions being coupled by despin motor and bearing assembly.

One problem with spin-stabilized satellites is that they may exhibit certain types of troublesome motions called "wobble", "precession" or "nutation". All such motions tend to result in a displacement of the satellite's geometric axis from its intended mission orientation or attitude.

Nutation of a satellite, or the coning motion of the spin axis about the total angular momentum vector, may result from any of the following disturbances: (1) booster final stage angular motion, (2) operation of separation equipment, (3) operation of payload components with uncompensated momentum, (4) motion of flexible elements of structure, (5) motion of liquids such as propellants or coolants, and (6) operation of mass expulsion devices on the spin-stabilized satellite.

In general, nutation is rotational motion about either or both of the transverse (non-spinning) axes which causes a rotational coning motion of the pitch (spin) axis about the total or resultant momemtum vector of the spacecraft. The rate of the coning motion is termed the nutation frequency and the cone angle of such motion is the amplitude of the nutation.

In order to maintain precise orientation of the satellite despun platform, nutation must be reduced or eliminated. The nutation of a conventional dual-spin satellite may be reduced by energy absorbing or momentum transfer devices operable on either or both of the transverse axes of the satellite to attenuate the nutation. Nutation effects may also be overcome by active dampers which develop a torque of opposite phase to that of the nutation torque. Several such systems use the despin motor to damp nutation. For example, in U.S. Pat. No. 4,096,427, the outputs of an accelerometer-based nutation sensor and a relative rotation rate sensor are processed to provide despin motor control signals so that the appropriate torques are applied by the despin motor to damp nutation. A second nutation control system, disclosed in U.S. Pat. No. 4,272,045, uses a horizon sensor to detect nutation. Other nutation control systems are disclosed in U.S. Pat. Nos. 3,695,554 and 3,830,447, and in Slafer and Marbach, Active Control of the Dynamics of a Dual-Spin Spacecraft", Journal of Spacecraft and Rockets, Vol. 12, May 1975, pages 287–293.

Another type of nutation control system provides active nutation damping by appropriately phased thruster pulses from one or more attitude control thrusters to provide a nutation damping torque. Such a system is shown in the paper entitled "An On-Board, Closed-Loop, Nutation Control System for a Spin Stabilized Spacecraft," by Lynn H. Grasshoff, published in the May 1968 edition of the Journal of Spacecraft and Rockets, Vol. 5, No. 5.

In order to sense or detect nutation in a dual-spin stabilized satellite, prior art nutation control systems usually employ either a rate sensor such as a gyroscope or accelerometer or a position sensor such as a horizon sensor or a beacon sensor. As mentioned above, some nutation control systems include a sensor for detecting the relative spin phase and rate between the rotor and platform. The relative spin phase sensor is necessary when the nutation sensor and torque applying means of the nutation control system are on opposite portions of the spinning satellite in order to provide the necessary information for coordinate translation of the nutation sensor signals to the coordinate system of the torque applying means.

It should be noted at this point that two goals which are always present in spacecraft design and production are to reduce the total spacecraft weight and to provide redundant or backup systems in case of a system failure. It is frequently the case that one of these goals must be sacrificed, at least partially, to achieve the other goal.

OBJECTS OF THE INVENTION

Accordingly, it is an object of the present invention to provide an improved nutation control system.

Another object of the invention is to provide a backup system for a nutation control system which includes both a nutation sensor and a relative spin phase sensor while minimizing increase in satellite weight.

It is a further object of the invention to provide a novel nutation sensor using a relative spin phase sensor.

SUMMARY OF THE INVENTION

These and other objects of the invention are achieved in a dual-spin stabilized satellite through the use of a relative spin phase sensor to provide nutation sensing. Such a dual-spin stabilized satellite includes a nominally spun rotor, a nominally despun platform and a despin motor and bearing assembly for controlling the relative rotational motion between the rotor and the platform. A relative spin phase sensor provides index pulses which are indicative of the relative spin phase between the rotor and the platform. These index pulses include information concerning nutation amplitude and frequency because, under nutation, the products of inertia of the platform with respect to the satellite center of mass cause the relative spin position between the rotor and the platform to be sinusiodally perturbed. This perturbation of the relative spin phase between the rotor and platform is detected by an index pulse arrive time circuit which provides the relative time positions of successive index pulses. A processor which contains information about the spacecraft dynamics, including the moments and products of inertia, receives the index pulse time measurements. The processor is adapted to generate an estimate of the nutation frequency and amplitude from the spacecraft dynamics and index pulse arrival time measurements. In the preferred embodiment, the processor is further adapted to generate control signals for spacecraft reaction control thrusters which apply nutation damping torques. In an alternative embodiment of the invention, the relative spin rate of the rotor and the platform is detected for determining nutation and the despin motor is used to apply nutation damping torques.

These and other objects of the present invention, together with the features and advantages thereof, will become apparent from the following detailed specification, when considered in conjunction with the accompanying drawing figures in which applicable reference numerals are carried forward.

BRIEF DESCRIPTION OF THE DRAWINGS

FIG. 1 is a representation of a dual-spin satellite constructed in accordance with the present invention;

FIG. 2 is a diagramatic representation of the relative positions of the rotor and platform of FIG. 1;

DETAILED DESCRIPTION OF THE INVENTION

Figure 3:
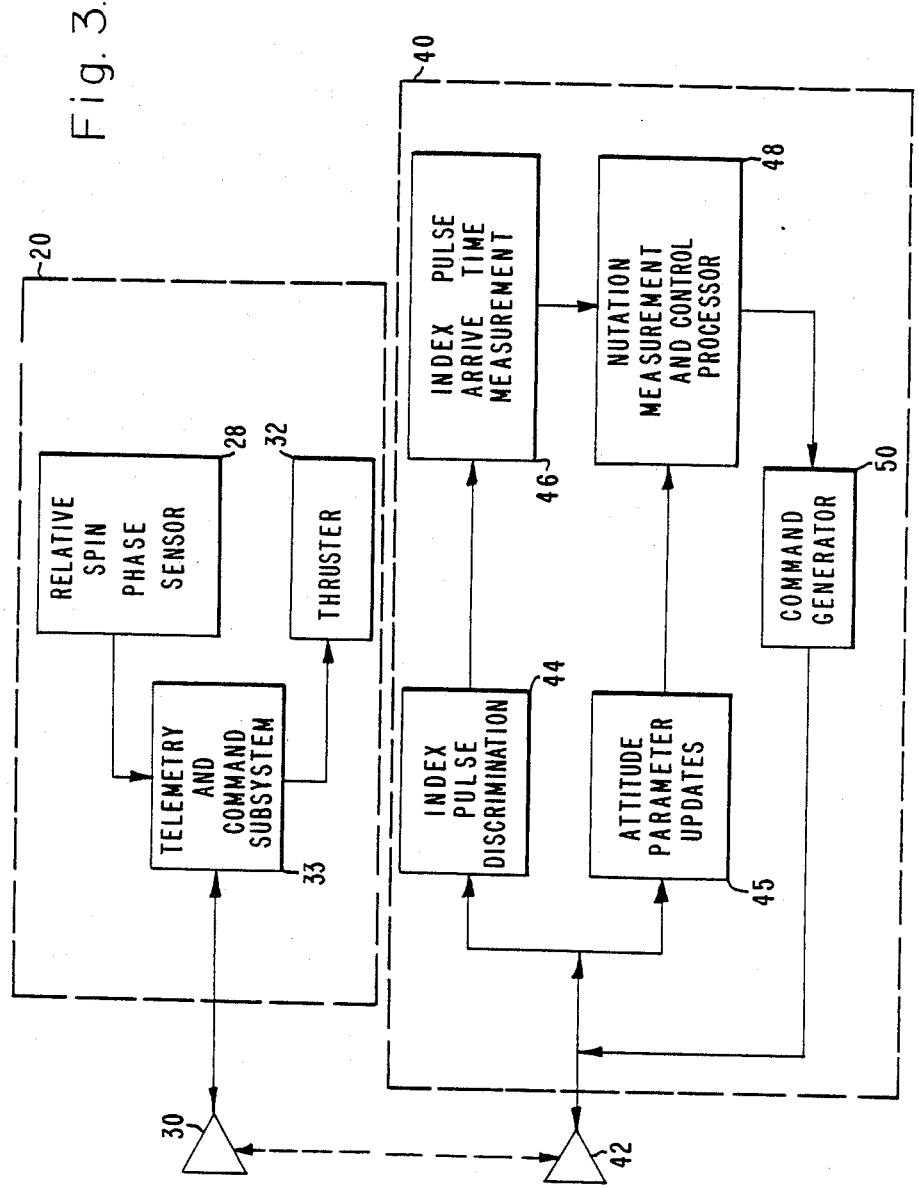
FIG. 3 is a schematic diagram showing the interconnection of various elements of a preferred embodiment of the present invention.

Referring now to the drawings, FIG. 1 illustrates an embodiment of the invention in which there is shown a dual-spin stabilized device or body indicated generally at 20. In the preferred embodiment, such a device is an orbiting satellite. The satellite 20 has a nominally despun platform 22 which is coupled to a nominally spun rotor 24 by means of a bearing assembly and despin motor 26. The "platform" 22 may be a body or member of any shape such as, for example, an antenna. The spin or pitch axis is illustrated by an arrow 25. Although the platform 22 is referred to as despun, it may be rotating with respect to the rotor 24. A relative spin phase or rate sensor 28 such as a shaft angle encoder is disposed on the satellite 20 and generates a signal in the form of successive index pulses indicative of the relative phase and rate of rotation of the rotor 24 with respect to the despun platform 22.

The angular relationship of the rotor 24 and the despun platform 22 is illustrated in FIG. 2. The relative rate sensor 28 is comprised of a magnet 34 mounted on the despun platform 22 and sensing coils 35 and 36 disposed on the rotor 24. The relative position or phase of the rotor 24 with respect to the platform 22 may be defined as the angle $\psi$ between a fixed traverse axis 37 on the platform 22 and a transverse axis 39 on the rotor 24. These axes may be aligned at a reference time (t=0). Index pulses are generated in the sensing coils as they pass the magnet 34.

The relative rate sensor 28 may be found already installed on the satellite 20 as part of a despin attitude or pointing system or as part of a nutation control system which includes a separate nutation sensor such as an accelerometer or a horizon sensor. Where the present invention is used with a spin stabilized device which has a nutation control system including both a relative rate sensor and an accelerometer, the present invention will function as a back-up system in case of failure of the primary nutation sensor. Alternatively, the nutation control sensor and system of the present invention may be used in a stand-alone configuration.

Referring now to FIG. 3, there is shown a schematic diagram indicating the interconnection of the elements of the nutation control system of the present invention. In the preferred embodiment, illustrated in FIG. 3, nutation measurement and control processing are performed at a ground station 40 and are performed for the control of a dual-spin stabilized satellite. However, it will be understood by those skilled in the art that measurement and control functions can be performed on-board the satellite 20 with a satellite electronics. The satellite 20 includes an antenna 30 mounted on the platform 22 for sending and receiving signals to and from the ground station 40 on the earth. The satellite 20 also includes at least one thruster 32 mounted on the rotor 24 for applying a torque to the satellite to damp nutation. Typically, the thruster 32 is one of a plurality of thrusters which are part of a satellite reaction control system. In an alternative embodiment, the nutation damping torque may be applied by appropriately timed activation of the despin motor 26 or other actuator capable of applying torques to the platform or rotor. When the despin motor 26 is used to apply the nutation damping torques, relative spin phase information is not required and nutation sensing may be accomplished by detecting and processing only the relative spin rates of the rotor and platform. A telemetry and command subsystem 33 controls the sending of index pulses from the relative phase or rate sensor 28 through the antenna 30 and the receiving of commands from the ground station 40 for the thruster 32 or alternatively the despin motor 26.

The ground station 40 includes an antenna 42 for receiving data signals from and sending control signals to the satellite 20. An index pulse discriminator 44 is coupled to the antenna 42 for separating out index pulses from other data signals. Other attitude data is received from the antenna 42 by an attitude parameter update system 45. The index pulses are provided to an index pulse arrive time circuit 46 which determines the relative time positions of successive index pulses. The circuit 46 output is coupled to a nutation measurement and control processor 48 which is described in more detail below with reference to FIG. 4. The nutation measurement and control processor 48 provides thruster execute pulses to a command generator 50 which is coupled to the ground station antenna 42. Thruster execute pulses are transmitted from the ground station antenna 42 to the satellite antenna 30 and relayed by the telemetry and command subsystem 33 to the thruster 32. Thruster execute commands are generated by the nutation measurement and control processor 48 when the nutation exceeds a predetermined threshold.

Looking now at how nutation information is derived by the present invention, in conventional designs of dual-spin satellites, the principal axis of inertia of the rotor is aligned with the bearing axis which joins the rotor and payload platform. The rotor is further statically balanced so that its center of mass lies on the common bearing axis. In steady state equilibrium, the rotor principal axis, bearing axis, and angular momentum vector are all coaligned. Nutation is a transient displacement of the bearing axis from the angular momentum vector analytically manifested by a spin plane component of angular momentum or rate, and physically by a coning motion of the bearing axis about the angular momentum vector. Since the payload platform does not spin, it is not necessary that it be balanced. Indeed, for the present invention to work it must have a dynamic imbalance or product of inertia in a plane containing the bearing axis. Present day communication satellites naturally have such a product of inertia produced by large reflectors set to the anti-earth side of the satellite to achieve proper focal relationship with reflector feeds. Other payloads often produce, or are easily arranged to produce a similar product of inertia. It should be noted that platform spin is not precluded, i.e., the described nutation coupling remains under platform spin and the present invention works in the presence of moderate platform spin rates.

In the presence of the described despun platform product of inertia, transverse coning (nutation) motion will couple to spin motion of the platform 22 and cause the relative spin position or phase $\psi$ between the rotor 24 and platform 22 to be perturbed sinusoidally at nutation frequency. This relation is provided in the following set of equations:

$$I_{11}\dot{\omega}_1 = -I_{11}\lambda_o\omega_2 \quad (1)$$

$$I_{22}\dot{\omega}_2 = +I_{22}\lambda_o\omega_1 \quad (2)$$

$$I_p\dot{\omega}_3 = I_{23}\omega_2 \quad (3)$$

where $\lambda_o$ is the nutation frequency, $I_{11}$ and $I_{22}$ are the total satellite transverse inertias, $I_p$ is the platform spin inertia, and $I_{23}$ is the platform product of inertia described above. The satellite transverse inertias $I_{11}$ and $I_{22}$, platform spin inertia $I_p$ and platform product of inertia $I_{23}$ are all inherent to a given satellite and are determined prior to launch and updated when necessary as, for example, when fuel is used. The nutation transverse rates are $\omega_1$ and $\omega_2$. The subscripts 1, 2 and 3 refer to a platform fixed coordinate system shown in FIG. 1. The perturbation of the platform spin acceleration $\dot{\omega}_3$ in equation (3) causes the oscillation or perturbation in the platform to rotor relative phase $\psi$. This relative phase oscillation causes on oscillation at nutation frequency $\lambda_o$, with a magnitude proportional to the nutation angle, in the relative time position of successive index pulses which are received from the relative spin phase sensor 28. The index pulse occurrence times are provided by the index pulse arrive time circuit 46 to the nutation measurement and control processor 48.

Figure 4:
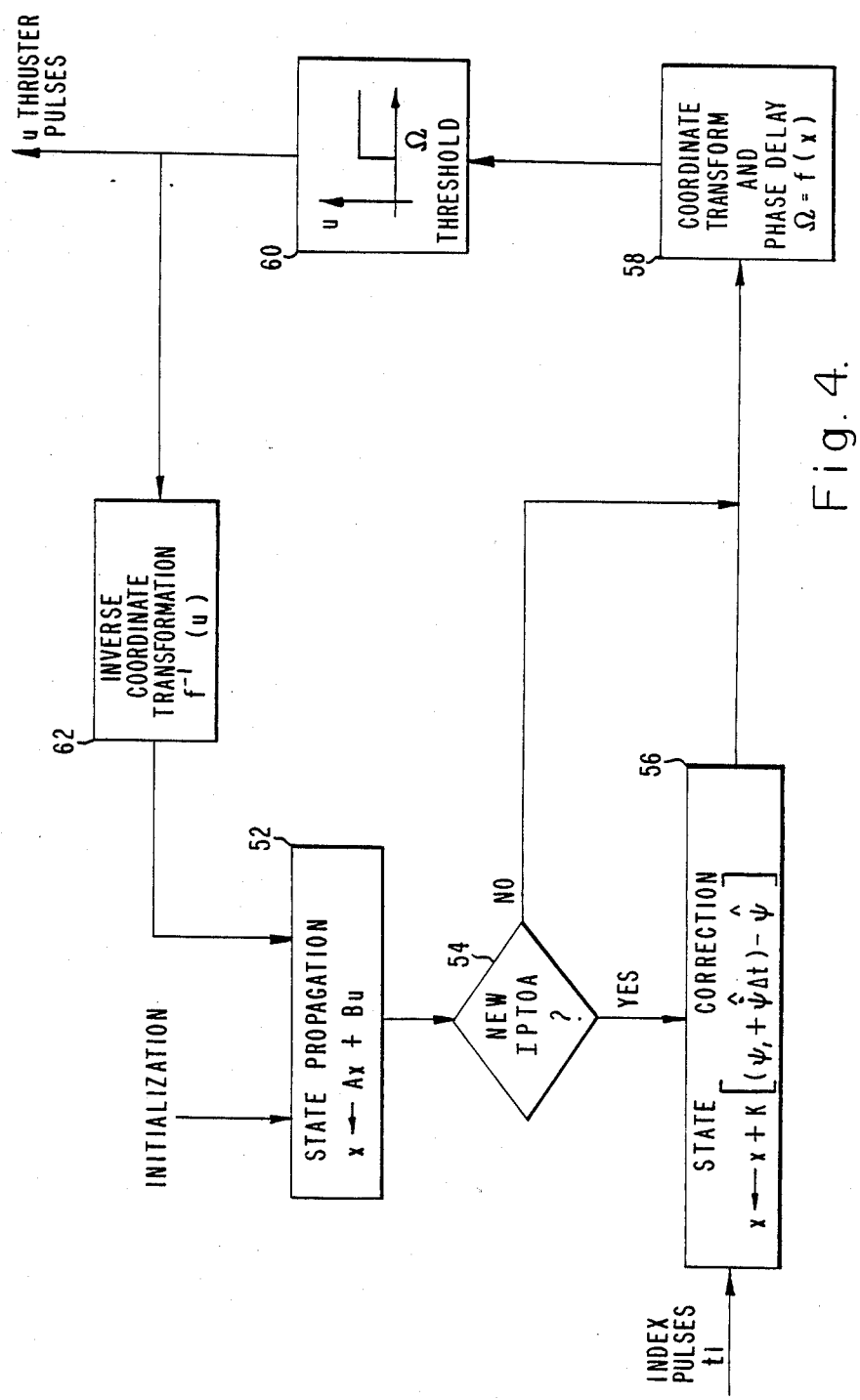
FIG. 4 is a logic diagram depicting the processing algorithm of the nutation measurement and control processor of FIG. 3.

Referring to FIG. 4, a logic diagram is shown depicting the processing algorithm performed by the nutation measurement and control processor 48. In the state propagation block 52, a four state estimate of the spacecraft motion x is updated by a model of the spacecraft nutation dynamics at a computation cycle interrupt period. The state estimate x includes the rotor to platform relative phase $\psi$ and relative rate $\dot{\psi}$ as well as the orthogonal platform angular rates of rotation $\omega_1$, $\omega_2$ in a plane normal to the spin axis 25. The state estimate x and any thruster torques are operated on by the system dynamics matrices A and B, respectively, to update the state estimate x. These system dynamics matrices are dependent on the mass properties and momentum of the satellite 20 and on the thruster geometry. A decision block 54 determines if a new index pulse has arrived since the last computation cycle interrupt. If there has been a new index pulse, a state correction block 56 corrects the state estimate x to incorporate the new data. The states representing the transverse angular rates of rotation $\omega_1$ and $\omega_2$ are the derived estimate of nutation. The correction is made by performing the function:

$$x \leftarrow x + K[(\hat{\psi}_1 + \dot{\psi}\Delta t) - \hat{\psi}]$$

where $$\Delta t = t_o - t_i;$$

$t_o$ is the time of computation update;
$t_i$ is the index pulse time of arrival;
$\psi_1$ is a constant initial phase between the rotor and platform;
$\hat{\dot{\psi}}$ is a computer estimate of the rate of change of the phase at any given time;
$\hat{\psi}$ is a computer estimate of the relative phase of the platform and the rotor at any given time; and
k is the state estimator gain matrix.

This construction, often referred to in controls literature as an observer or estimator, will cause the filter states, $\omega_1$, $\omega_2$, $\dot{\psi}$ and $\psi$ to follow actual states of the vehicle.

The estimated states, $\hat{\omega}_1$, $\hat{\omega}_2$ and in some cases $\hat{\psi}$ are used to operate actuators in a manner to damp vehicle nutation. In the preferred embodiment, this is done by thresholding a control signal generated from the state estimates. A modulation and phase delay block 58 establishes the proper phase for the control signal to be transmitted to the satellite 20. There is also a coordinate transformation of the state estimate x to rotor fixed coordinates if required as is the case with the preferred embodiment where the thruster 32 which applies nutation damping torque is mounted on the rotor 24. In an embodiment where the damping torque is applied by the despin motor 26 and despun product of inertia reaction, no coordinate transformation is required. In this case only the states $\omega_1$ and $\omega_2$ are actually used to operate the actuator. The phase delayed and coordinate transformed state estimate is then provided to a threshold block 60 which provides thruster pulse signals to the command generator 50 when the nutation exceeds a predetermined threshold. The thruster command signals are transmitted to the satellite 20 by the ground station antenna 42. Where the state estimate x has been coordinate transformed to rotor fixed coordinates, an inverse coordinate transform block 62 receives the thruster pulses u and transforms the signals back into platform fixed coordinates. The transformations utilize the estimate $\hat{\psi}$ of the relative phase, $\psi$. The thruster pulse signals are then fed back into the system dynamics model at the state propagation block 52. For an embodiment where the nutation damping torque is applied by the despin motor 26, the two coordinate transformations in the blocks 58 and 62 are not required.

While the present invention has been shown and described with reference to a preferred embodiment, it will be understood that numerous modifications, changes, variations, substitutions and equivalents will now occur to those skilled in the art without departing from the spirit and scope of the invention. Accordingly, it is intended that the invention herein be limited only by the scope of the appended claims.

What is claimed is:

1. A nutation control system for a dual-spin stabilized device having a nominally spun rotor and a nominally despun platform, said system comprising:
   a relative spin phase sensor for sensing the relative spin phase between said rotor and said platform and for providing successive signals indicative thereof;

means for receiving said signals from said spin phase sensor and for calculating the nutation of said device from the relative positions of successive relative phase signals; and means for applying a torque to said device to reduce the nutation of said device.

2. The system of claim 1, wherein said device is an orbiting satellite and wherein said successive signals are index pulses.

3. The system of claim 2 and further including:
a ground station;
means for transmitting said index pulses to said ground station;
means for detecting the relative time positions of said index pulses;
said detecting means and said calculating means being located at said ground station; and
means, coupled to the output of said calculating means, for transmitting control signals from said ground station to said satellite to control said torque applying means.

4. The system of claim 2 wherein said torque applying means includes at least one thruster positioned on said rotor.

5. The system of claim 2 wherein said at least one thruster is fired when the nutation exceeds a predetermined threshold.

6. The system of claim 2, wherein said torque applying means is a despin motor.

7. A nutation control system for a dual-spin stabilized satellite having a nominally spun rotor and a nominally despun platform, said system comprising:
a relative spin phase sensor for sensing the relative spin phase between said rotor and said platform and for providing index pulses indicative thereof;
a downlink antenna for transmitting satellite attitude data including said index pulses;
a ground station receiving antenna for receiving said satellite attitude data;
means for separating said index pulses from said satellite attitude data;
means for measuring the arrival times of said separated index pulses;
means for calculating the nutation of said satellite from the measured index pulse arrival times;
means for generating control signals for compensating for nutation;
an uplink antenna for transmitting said control signals to said satellite;
a satellite receiving antenna for receiving said control signals; and
means, responsive to said received control signals, for applying a torque to said satellite to reduce the satellite nutation.

8. The system of claim 7, wherein said relative spin phase sensor is a shaft angle encoder.

9. A nutation sensor for use with a dual-spin stabilized satellite having a nominally spun rotor and a nominally despun platform, said sensor comprising:
a relative spin phase sensor for sensing the relative spin phase between said rotor and said platform and for providing signals indicative thereof;
means for detecting the relative time positions of successive ones of said signals; and
means for calculating the nutation of said satellite from the relative time positions of successive signals.

10. The nutation sensor of claim 9 wherein said signals are index pulses from said relative phase sensor.

11. The nutation sensor of claim 10 wherein said calculating means calculates the nutation of said satellite based on sinusoidal perturbations in the relative time positions of successive index pulses caused by coupling of satellite nutation motion with spin motion of said platform.

12. A method for sensing nutation of a dual-spin stabilized satellite having a nominally spun rotor and a nominally despun platform comprising the steps of:
sensing a relative spin phase and rate between said rotor and said platform;
generating index pulses indicative of said relative spin phase and rate;
detecting the relative time positions of successive index pulses; and
calculating the nutation of said satellite from the relative time positions of successive index pulses.

13. The method of claim 11 wherein said calculating step uses the sinusoidal perturbations in the relative time positions of successive index pulses caused by coupling of satellite nutation motion with spin motion of said platform to calculate the satellite nutation.

14. A method for controlling the nutation of a dual-spin stabilized satellite having a nominally spun rotor and a nominally despun platform, said method comprising the steps of:
sensing a relative spin phase and rate between said rotor and said platform;
providing index pulses indicative of said relative spin phase and rate;
detecting the relative time positions of successive index pulses;
calculating the nutation of said satellite from the relative time positions of successive index pulses; and
applying a torque to said satellite to reduce satellite nutation.

15. The method of claim 13 and further including the steps of:
transmitting satellite attitude data including said index pulses to a ground station;
receiving said satellite attitude data at said ground station;
separating said index pulses from received satellite attitude data;
generating control signals for compensating for satellite nutation;
transmitting said control signals from said ground station to said satellite;
receiving said control signals at said satellite; and
applying said torque in response to said control signals.

16. A nutation control system for a dual-spin stabilized device having a nominally spun rotor and a nominally despun platform, said system comprising:
a relative spin rate sensor for sensing the relative spin rate between said rotor and said platform and for providing successive signals indicative thereof;
means for receiving said signals from said spin rate sensor and for calculating the nutation of said device from the relative rate signals; and
means for applying a torque to said device to reduce the nutation of said device.

17. The system of claim 16, wherein said device is an orbiting satellite and wherein said successive signals are index pulses.

18. The system of claim 17 wherein said torque applying means is a despin motor.

* * * * *